US009435950B2

(12) United States Patent
Kono et al.

(10) Patent No.: US 9,435,950 B2
(45) Date of Patent: Sep. 6, 2016

(54) SEMICONDUCTOR OPTICAL DEVICE

(71) Applicant: SUMITOMO ELECTRIC INDUSTRIES, LTD., Osaka (JP)

(72) Inventors: Naoya Kono, Yokohama (JP); Kazuhiko Horino, Hadano (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/806,329

(22) Filed: Jul. 22, 2015

(65) Prior Publication Data

US 2016/0025922 A1    Jan. 28, 2016

(30) Foreign Application Priority Data

Jul. 24, 2014  (JP) ................. 2014-151099

(51) Int. Cl.
*G02F 1/035* (2006.01)
*G02B 6/122* (2006.01)
*G02F 1/025* (2006.01)
*G02F 1/21* (2006.01)
*G02B 6/12* (2006.01)
*G02B 6/30* (2006.01)

(52) U.S. Cl.
CPC ............. *G02B 6/1228* (2013.01); *G02F 1/025* (2013.01); *G02B 6/30* (2013.01); *G02B 6/305* (2013.01); *G02B 2006/12152* (2013.01); *G02B 2006/12195* (2013.01); *G02F 2001/212* (2013.01)

(58) Field of Classification Search
CPC ...... G02B 6/1228; G02B 6/30; G02B 6/305; G02B 2006/12195; G02B 2006/12152; G02F 1/025; G02F 2001/212
See application file for complete search history.

(56) References Cited

U.S. PATENT DOCUMENTS

| 4,415,227 | A | * | 11/1983 | Unger | .................... G02B 6/262 385/43 |
| 5,574,808 | A | * | 11/1996 | van der Tol | ............ G02F 1/025 385/16 |
| 6,293,688 | B1 | * | 9/2001 | Deacon | ................ G02B 6/1228 362/551 |
| 6,580,850 | B1 | * | 6/2003 | Kazarinov | ......... G02B 6/12004 385/16 |
| 6,768,855 | B1 | * | 7/2004 | Bakke | .................. G02B 6/1228 385/129 |
| 6,778,737 | B2 | * | 8/2004 | Shimoda | .............. G02B 6/1228 385/129 |
| 6,795,622 | B2 | * | 9/2004 | Forrest | ................... B82Y 20/00 372/6 |

(Continued)

FOREIGN PATENT DOCUMENTS

| JP | H05-142435 | 6/1993 |
| JP | H09-015435 | 1/1997 |

*Primary Examiner* — Ryan Lepisto
*Assistant Examiner* — Guy Anderson
(74) *Attorney, Agent, or Firm* — Smith, Gambrell & Russell, LLP.

(57) ABSTRACT

A semiconductor optical device including: a substrate including a first region and a second region; a first optical waveguide disposed on the first region, the first optical waveguide including a core layer and a cladding layer disposed on the core layer, the cladding layer including a first cladding region and a semiconductor layer disposed on the first cladding region, the first optical waveguide extending from an end facet of the semiconductor optical device to a boundary between the first region and the second region; a second optical waveguide disposed on the second region; and a region disposed on the cladding layer, the region having a lower refractive index than that of the first cladding region. The semiconductor layer has a higher refractive index than that of the first cladding region. The thickness of the core layer monotonically increases from the end facet toward the boundary.

10 Claims, 6 Drawing Sheets

(56) References Cited

U.S. PATENT DOCUMENTS

| | | | | |
|---|---|---|---|---|
| 6,813,419 B2* | 11/2004 | Matsushima | G02B 6/10 | 385/124 |
| 6,884,327 B2* | 4/2005 | Pan | C23C 14/044 | 204/192.12 |
| 7,079,727 B1* | 7/2006 | Little | G02B 6/132 | 385/130 |
| 7,221,826 B2* | 5/2007 | Hanashima | G02B 6/12007 | 385/129 |
| 7,356,226 B2* | 4/2008 | Watanabe | G02B 6/1228 | 385/131 |
| 8,116,602 B2* | 2/2012 | Little | G02B 6/1228 | 385/129 |
| 8,126,301 B2* | 2/2012 | Ishizaka | G02B 6/1228 | 216/51 |
| 8,170,383 B2* | 5/2012 | Tokushima | G02B 6/1228 | 385/14 |
| 8,254,737 B2* | 8/2012 | Choudhury | G02B 6/1228 | 385/146 |
| 8,483,528 B2* | 7/2013 | Socci | G02B 6/1228 | 385/131 |
| 8,718,432 B1* | 5/2014 | Heideman | G02B 6/1228 | 216/13 |
| 8,837,884 B2* | 9/2014 | Suzuki | G02B 6/305 | 385/27 |
| 9,025,920 B2* | 5/2015 | Kim | G02B 6/305 | 385/43 |
| 9,128,240 B2* | 9/2015 | Hatori | G02B 6/12 | |
| 2001/0026670 A1* | 10/2001 | Takizawa | G02B 6/1228 | 385/129 |
| 2004/0114869 A1* | 6/2004 | Fike | G02B 6/124 | 385/43 |
| 2007/0172185 A1* | 7/2007 | Hutchinson | G02F 1/025 | 385/129 |
| 2008/0044126 A1* | 2/2008 | Costa | G02B 6/1228 | 385/14 |
| 2012/0321244 A1* | 12/2012 | Suzuki | G02B 6/305 | 385/14 |
| 2014/0140659 A1* | 5/2014 | Demaray | G02B 6/132 | 385/28 |
| 2015/0277043 A1* | 10/2015 | Shimizu | G02B 6/1228 | 385/14 |

* cited by examiner

FIG. 1A
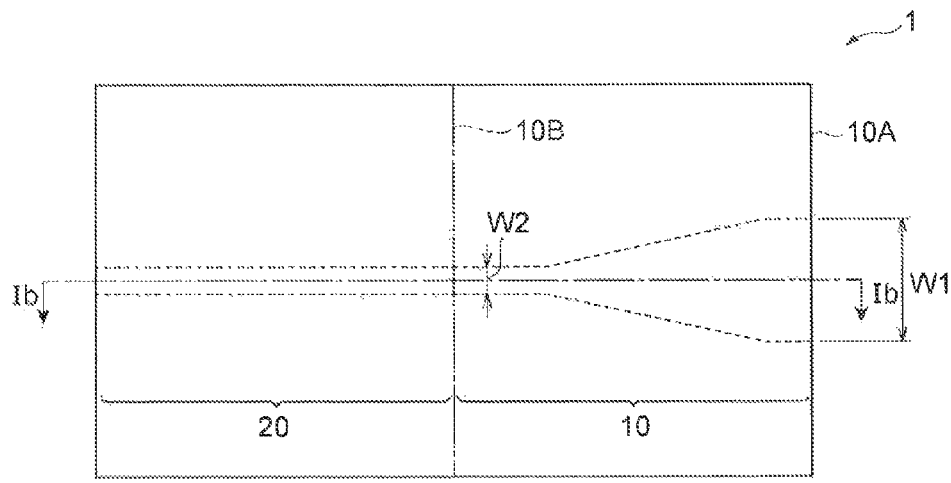
FIG. 1C  FIG. 1D  FIG. 1E  FIG. 1F
FIG. 1B
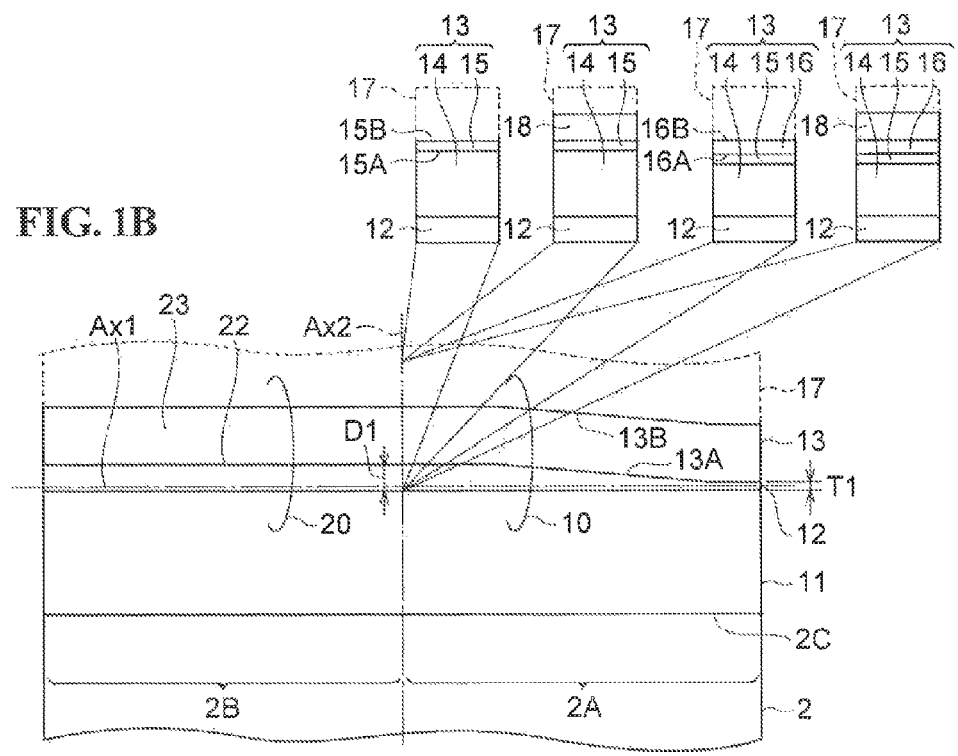

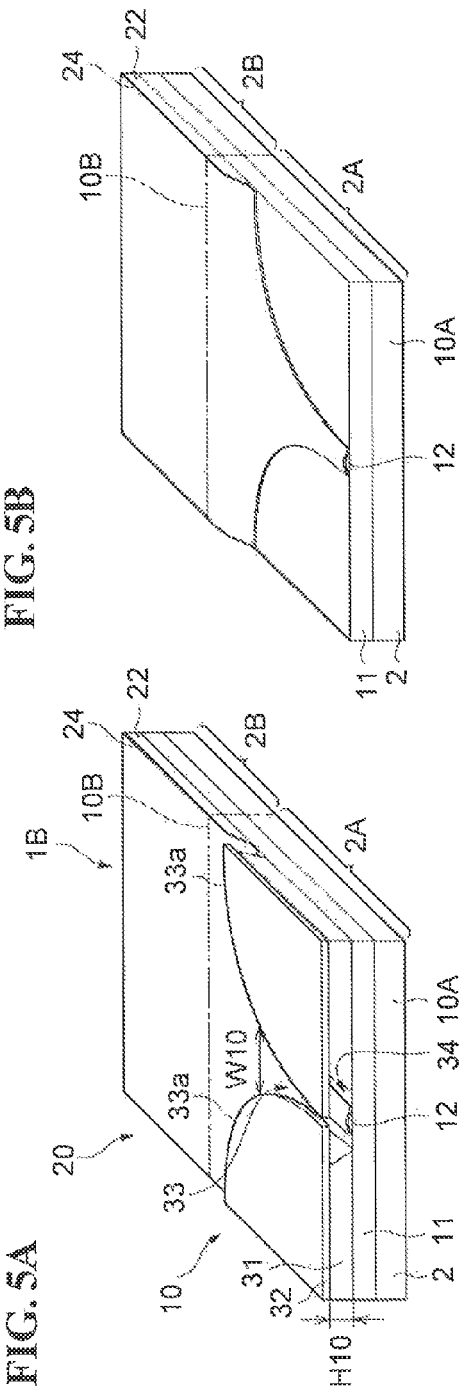
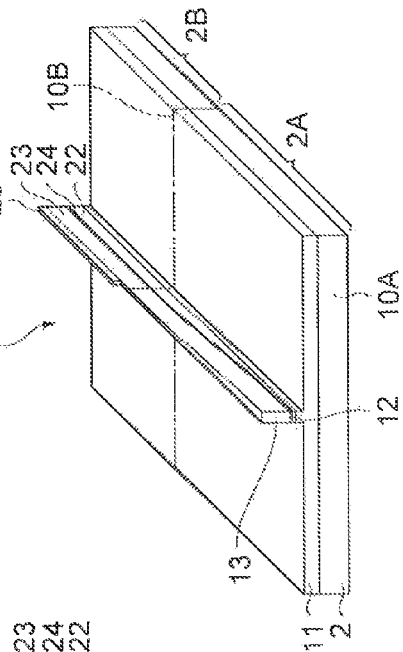
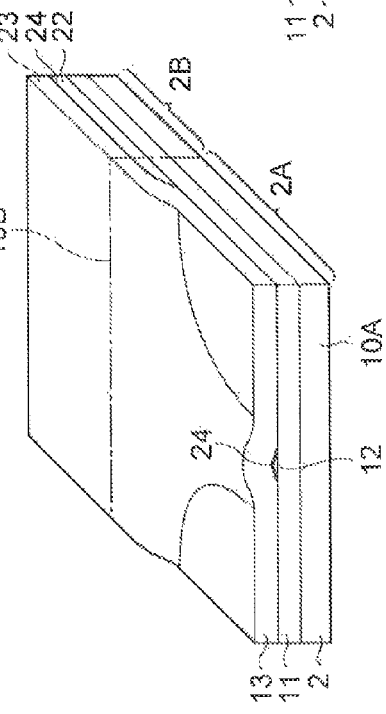
FIG. 5A
FIG. 5B
FIG. 5C
FIG. 5D

SEMICONDUCTOR OPTICAL DEVICE

BACKGROUND OF THE INVENTION

1. Field of the Invention

The present invention relates to a semiconductor optical device including a spot-size converter.

2. Description of the Related Art

Japanese Unexamined Patent Application Publication No. 5-142435 (Patent Literature 1) discloses a waveguide-type beam conversion device for spot-size conversion. Japanese Unexamined Patent Application Publication No. 9-15435 (Patent Literature 2) discloses an optical coupling device for spot-size conversion.

The beam conversion device disclosed in Patent Literature 1 includes an upper cladding layer and a lower cladding layer that sandwich a main core layer, in which each of the cladding layers includes a plurality of auxiliary core layers and a plurality of cladding layers that are alternately arranged. In the upper cladding layer and the lower cladding layer, the auxiliary core layers function so as to enhance the electric field amplitude of light, and the shape of the electric field profile of the beam conversion device has a plurality of peaks. In the beam conversion device, a spot size on a facet of the device is expanded due to the electric field profile having the plurality of peaks, thereby reducing coupling loss between the beam conversion device and the external optical waveguide.

The optical coupling device disclosed in Patent Literature 2 includes a cladding region having a projecting portion that is located right on a core layer. This projecting portion functions so as to increase the thickness of a cladding region right on the core layer. The increased thickness of the cladding region can make a spot size of the optical coupling device expanded, thereby reducing coupling loss between the optical coupling device and the external optical waveguide.

SUMMARY OF THE INVENTION

In the spot-size converters disclosed in Patent Literature 1 and Patent Literature 2, the thickness of a cladding layer is increased at a facet of the device. The cladding layers are specially formed for the spot-size converters with respect to the thickness. Meanwhile, such cladding layers are not suitable for an active device such as laser diode or semiconductor modulator that is monolithically integrated with the spot-size converter. Such an active device may not be compatible with a cladding layer that is specially formed for a spot-size converter.

It is desirable to provide a semiconductor optical device that includes a spot-size converter including a cladding layer that has good compatibility with a cladding layer of an active optical device integrated with the spot-size converter.

A semiconductor optical device according to an aspect of the present invention includes a substrate including a first region and a second region being arranged in a first direction; a first optical waveguide disposed on the first region, the first optical waveguide including a core layer and a cladding layer disposed on the core layer, the cladding layer including a first cladding region and a semiconductor layer disposed on the first cladding region, the first optical waveguide extending in the first direction from an end facet of the semiconductor optical device to a boundary between the first region and the second region; a second optical waveguide disposed on the second region, the second optical waveguide being optically connected to the first optical waveguide at the boundary; and a region disposed on the cladding layer, the region having a lower refractive index than that of the first cladding region. The semiconductor layer has a higher refractive index than that of the first cladding region. The core layer has a first thickness at a vicinity if the end facet of the semiconductor optical device and a second thickness at the boundary between the first region and the second region. The thickness of the core layer monotonically increases from the first thickness to the second thickness in the first region along the first direction.

BRIEF DESCRIPTION OF THE DRAWINGS

FIGS. 1A to 1F are views illustrating a structure of a semiconductor optical device according to a first embodiment.

FIGS. 5A to 5D are views each illustrating a step of a method for producing a semiconductor optical device according to the first embodiment.

DESCRIPTION OF THE PREFERRED EMBODIMENTS

Figure 2:
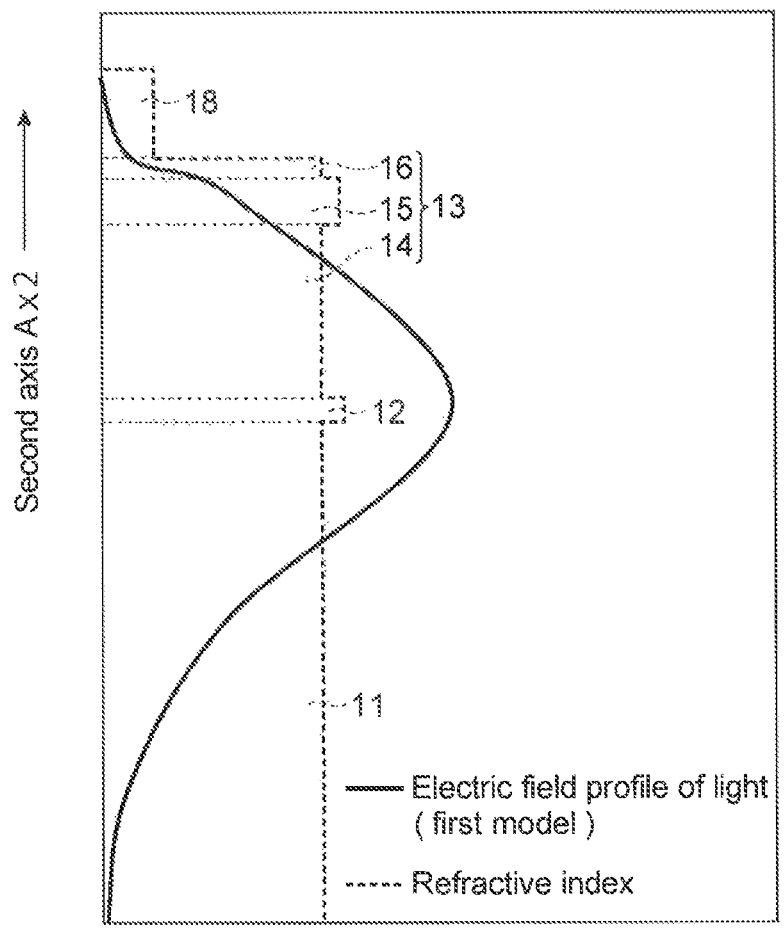
FIG. 2 is a graph showing an electric field profile of light in an example of a first optical waveguide.

The content of embodiments of the present invention will be described. A semiconductor optical device according to an embodiment of the present invention includes (a) a substrate including a first region and a second region being arranged in a first direction, (b) a first optical waveguide disposed on the first region, the first optical waveguide including a core layer and a cladding layer disposed on the core layer, the cladding layer including a first cladding region and a semiconductor layer disposed on the first cladding region, the first optical waveguide extending in the first direction from an end facet of the semiconductor optical device to a boundary between the first region and the second region, (c) a second optical waveguide disposed on the second region, the second optical waveguide being optically connected to the first optical waveguide at the boundary, and (d) a region disposed on the cladding layer, the region having a lower refractive index than that of the first cladding region. In the semiconductor optical device, the semiconductor layer has a higher refractive index than that of the first cladding region. The core layer of has a first thickness at a vicinity of the end facet of the semiconductor optical device and a second thickness at the boundary between the first region and the second region. The thickness of the core layer monotonically increases from the first thickness to the second thickness in the first region along the first direction.

According to this semiconductor optical device, the core layer of the first optical waveguide has a first thickness at a vicinity of the end facet of the semiconductor optical device and a second thickness at the boundary between the first region and the second region. The first thickness is smaller than the second thickness. The thickness of the core layer monotonically increases from the first thickness to the second thickness along the first direction. In this first optical waveguide, with regard to the electric field profile of light, light is confined mostly in the core layer at the boundary and distributes both the core layer and the cladding layer at the end facet. The electric field amplitude of light expands and is spreading into the cladding layer, as the light travels in the first optical waveguide from the boundary toward the end facet. This cladding layer includes a semiconductor layer with a relatively high refractive index in addition to a first cladding region with a relatively low refractive index. The refractive index of the first cladding region is lower than the refractive index of the core layer. Due to the effect of the combination between the first cladding region and the semiconductor layer, the electric field amplitude of light decreases slowly in the first cladding region in a second direction which intersects the first direction. In addition, a region having a lower refractive index than the first cladding region is provided on the cladding layer. Therefore, due to the effect of the combination between the region and the semiconductor layer, the electric field amplitude of light can be rapidly decreased in the region disposed on the cladding layer. Such a cladding layer is suitable for the first optical waveguide that includes a spot-size converter.

In the semiconductor optical device according to an embodiment, the second optical waveguide may have a cladding layer having substantially the same thickness as that of the first optical waveguide. As the cladding layer includes only one semiconductor layer, a total thickness of the cladding layer is decreased. Such a cladding layer is suitable for the second optical waveguide that includes an active device such as a semiconductor modulator In the semiconductor optical device according to an embodiment, the first optical waveguide may have a first width at the end facet and a second width at the boundary. The width of the first optical waveguide may monotonically decrease from the first width to the second width in the first region along the first direction. This width helps the light traveling in the first optical waveguide being expanded in a third direction intersecting the first and second directions.

In the semiconductor optical device according to an embodiment, the region disposed on the cladding layer may be composed of a silicon dioxide or a benzocyclobutene (BCB) resin. These materials can provide a lower refractive index than that of the first cladding region. These materials can protect the surface of the first optical waveguide. The electric field amplitude of light in the semiconductor layer is adjusted by changing the refractive indices of the materials used for the region In the semiconductor optical device according to an embodiment, the cladding layer may further include a second cladding region on the semiconductor layer. The second cladding region may have a thickness smaller than that of the first cladding region. The second cladding region may have a refractive index lower than that of the semiconductor layer. The second cladding region may be in contact with the region and with the semiconductor layer. According to this semiconductor optical device, the electric field amplitude of light in the first cladding region and the semiconductor layer is adjusted by the existence of the second cladding region. In addition, the electric field amplitude of light in the semiconductor layer is adjusted by changing the thickness and the refractive index of the second cladding region.

In the semiconductor optical device according to an embodiment, the second cladding region may be composed of InP. In the semiconductor optical device according to an embodiment, the first cladding region may be composed of InP, the core layer may be composed of AlGaInAs, and the semiconductor layer may be composed of AlGaInAs. These materials can be used in the semiconductor optical device.

In the semiconductor optical device according to an embodiment, the first optical waveguide may include a spot-size converter, and the second optical waveguide may include an Mach-Zehnder modulator.

Semiconductor optical devices according to embodiments will now be described with reference to the drawings. In a description below, the same components in a description of figures are assigned the same reference numerals.

First Embodiment

FIGS. 1A to 1F are views illustrating a structure of a semiconductor optical device according to a first embodiment. FIG. 1A is a plan view that schematically illustrates the semiconductor optical device. FIG. 1B is a cross-sectional view taken along line 1b-1b in FIG. 1A. FIGS. 1C to 1F are views illustrating typical structural examples of FIG. 1B.

Referring to FIGS. 1A and 1B, a semiconductor optical device 1 according to the first embodiment includes a first semiconductor optical waveguide 10 and a second semiconductor optical waveguide 20. The first optical waveguide 10 is disposed on a first region 2A of a substrate 2. The second optical waveguide 20 is disposed on a second region 2B on the substrate 2. The first and second optical waveguides 10 and 20 extend along a first direction Ax1. The first optical waveguide 10 is optically coupled with the second optical waveguide 20 at a boundary 10B between the first region 2A and the second region 2B. The first optical waveguide 10 extends to an end facet 10A of the optical device 1 from the boundary 10B. The end facet 10A of the semiconductor optical device 1 is optically coupled with an external optical waveguide such as an optical fiber or a lens.

The first optical waveguide 10 is provided for a spot-size converter. The first optical waveguide 10 receives light from the external optical waveguide, and converts the spot-size (i.e. the distribution of electric field of the light) so as to adapted to the spot-size of the second optical waveguide 20. The first optical waveguide 10 receives light from the second optical waveguide 20 and converts the spot-size to adapt to the external optical waveguide.

As illustrated in FIG. 1A, the first optical waveguide 10 has a first width W1 at a position of the end facet 10A and a second width W2 at a position of the boundary 10B. The first width W1 is larger than the second width W2. The width of the first optical waveguide 10 monotonically changes from the first width W1 to the second width W2 with respect to the direction of the first axis Ax1. This monotonous change is preferably a monotonous decrease. When a width of a waveguide "monotonically decreases", the width continues decreasing along a waveguide. When a width of a waveguide "monotonically changes", the waveguide may include a waveguide portion whose width is uniform in addition to a portion whose width "monotonically decreases". The side of the first and second optical waveguides 10 and 20 are provided with a material having low refractive index such as an insulating film.

Referring to FIG. 1B, the first optical waveguide 10 and the second optical waveguide 20 are provided on a principal surface 2C of a substrate 2. The substrate 2 includes a first region 2A and a second region 2B. The first optical waveguide 10 is provided on the first region 2A, and the second optical waveguide 20 is provided on the second region 2B. The first region 2A and the second region 2B are arranged in order in a direction of the first axis Ax1.

The first optical waveguide 10 includes a lower cladding layer 11, a core layer 12, and a cladding layer 13. The lower cladding layer 11, the core layer 12, and the cladding layer 13 are stacked in that order on the substrate 2. The cladding layer 13 includes a first cladding region 14 and a single semiconductor layer 15. The cladding layer 13 may include a second cladding region 16 on the semiconductor layer 15. The cladding layer 13 has a first surface 13A and a second surface 13B. The first surface 13A is located on the side opposite to the second surface 13B. The cladding layer 13 is disposed on the core layer 12. A region 17 is disposed on the cladding layer 13. The first surface 13A of the cladding layer 13 is in contact with the core layer 12. The second surface 13B of the cladding layer 13 is in contact with the region 17. The first cladding region 14 is in contact with an upper surface of the core layer 12. The semiconductor layer 15 has a first surface 15A and a second surface 15B. The first surface 15A is located on the side opposite to the second surface 15B. The first surface 15A of the semiconductor layer 15 is in contact with the first cladding region 14.

The second optical waveguide 20 includes a core layer 22, and includes the lower cladding layer 11 and a cladding layer 23 that sandwich the core layer 22. The cladding layer 23 includes the first cladding region 14 and the semiconductor layer 15 which are the same layers as the cladding layer 13. The cladding layer 23 may include the second cladding region 16 on the semiconductor layer 15. The second optical waveguide 20 is optically coupled with the first optical waveguide 10 at the boundary 10B between the first region 2A and the second region 2B. The second optical waveguide 20 includes a Mach-Zehnder modulator. The second optical waveguide 20 may include an optical waveguide device such as a semiconductor laser, or a semiconductor waveguide-type photodiode, or may be included in such an optical waveguide device. In this embodiment, the first optical waveguide 10 is optically connected to the second optical waveguide 20 at the boundary 10B. The core layers 12 and 22 are continuously connected at the boundary 10B. The core layers 12 and 22 have the same material and thickness at the boundary 10B.

As illustrated in FIG. 1B, the core layer 12 has a first thickness T1 at a vicinity of the end facet 10A. The core layer 12 has a second thickness D1 at a vicinity of the boundary 10B. The second thickness D1 is larger than the first thickness T1. The thickness of the core layer 12 monotonically changes from the first thickness T1 to the second thickness D with respect to the direction of the first axis Ax1. The "monotonous change" may be preferably a monotonous increase. Owing to the change of the width of the waveguide 10 and the thickness of the core layer 12, the electric field profile of light expands from the boundary 10B to the end facet 10A in the first optical waveguide 10. In the second region 2B, the thickness of the core layer 20 and the width of the waveguide 20 are substantially constant.

As illustrated in FIG. 11B, the cladding layers 13 and 23 are continuously connected at the boundary 10B. The cladding layers 13 and 23 have the same material and thickness at the boundary 10B. The thickness of the cladding layers 13 is constant in the first region 2A.

The first cladding region 14 has a lower refractive index than that of the core layer 12. The second cladding region 16 has a lower refractive index than that of the core layer 12. The refractive index of the semiconductor layer 15 is higher than those of the first and second cladding regions 14 and 16. The refractive index of the semiconductor layer 15 is lower than that of the core layer 12. The region 17 has a lower refractive index than those of the first and second cladding regions 14 and 16. The thickness of the semiconductor layer 15 is smaller than the thickness of the first cladding region 14. The first cladding region 14 and the semiconductor layer 15 are arranged in the direction of a second axis Ax2 that intersects the direction of the first axis Ax1. In a preferred embodiment, the first axis Ax1 is orthogonal to the second axis Ax2.

In the first optical waveguide 10, with regard to the electric field profile of light, a peak of the electric field profile of light exists in the core layer 12. The electric field of light also distributes in the cladding layers 11 and 13. The intensity of the electric field gradually decreases in the cladding layer 11 and 13 leaving from the core layer 12. The cladding layer 13 includes the first cladding region 14 that is in contact with the core layer 12, and the semiconductor layer 15 provided in the first cladding region 14. The refractive index of the first cladding region 14 is lower than the refractive indices of the core layer 12 and the semiconductor layer 15. Due to the existence of the semiconductor layer 15 having the higher refractive index than that of the first cladding region 14, the intensity of the electric field in the first cladding region 14 decreases slowly along the second axis Ax2 towards the semiconductor layer 15.

In addition, the region 17 having a lower refractive index than the first cladding region 14 is provided on the cladding layer 13. Accordingly, due to the effect of the combination between the semiconductor layer 15 and the region 17, the intensity of the electric field is rapidly decreased in the region 17. The profile of the electric field of light in the direction along the second axis Ax2 is adjusted by the combination of the first cladding region 14, the semiconductor layer 15 and the region 17. The profile of the electric field of light in the direction along the second axis Ax2 can be adjusted by changing the thickness of the first cladding region 14 and the semiconductor layer 15. The profile of the electric field along the second axis Ax2 can be adjusted by changing the refractive indices of the first cladding region 14, the semiconductor 15 and the region 17. Since the cladding layer 13 includes only one semiconductor layer 15, the total thickness of the cladding layer 13 is kept small. Thus, the cladding layer having the same thickness and material can be adapted to the cladding layer 23 in the second optical waveguide 20 where the thick cladding layer is not preferable.

Next, some structural examples of the cladding layer 13 will be described.

(STRUCTURAL EXAMPLE 1)

Referring to FIG. 1C, in the first optical waveguide 10, a cladding layer 13 includes a first cladding region 14 and a semiconductor layer 15. The first cladding region 14 and the semiconductor layer 15 are arranged in order in the direction of the second axis Ax2. In the present embodiment, a second surface 15B of the semiconductor layer 15 is in contact with the air (a region 17 in this example). The air (the region 17) has a lower refractive index than the first cladding region 14. Accordingly, due to the effect of the combination between the first cladding region 14 and the semiconductor layer 15 having a higher refractive index than the first cladding region 14, the electric field of light oozed outside the core layer 12 decreases slowly in the first cladding region 14 along the direction Ax2.

In addition, since the semiconductor layer 15 in the cladding layer 13 is in contact with the region 17, the electric field profile of light rapidly decreases on the outside of the cladding layer 13. As the decrease in the first cladding region is slow, the electric field profile in the first cladding region 14 resembles the electric filed profile in the lower cladding layer 11. Thus, the electric field profile of light becomes approximately symmetrical. The symmetrical profile of light is preferable for the spot-size converter to reduce the coupling loss with the external optical waveguide. In addition, an undesirable peak of the electric field profile at the semiconductor layer 15 is avoided by the proximity of the region 17 to the semiconductor layer 15.

In the first optical waveguide 10, the cladding layer 13 including the first cladding region 14 and the single semiconductor layer 15 can realize spot-size conversion without providing a cladding having a very large thickness. The structure of the cladding layer 13 can be adapted to the cladding layer 23 in the second optical waveguide 20. Accordingly, a semiconductor optical device 1 that includes a spot-size converter is provided in which the spot-size converter includes a cladding layer that has good compatibility with a cladding layer of an optical waveguide device integrated with the spot-size converter.

STRUCTURAL EXAMPLE 2

Referring to FIG. 1D, in the first optical waveguide 10, a cladding layer 13 includes a first cladding region 14 and a semiconductor layer 15. The first cladding region 14 and the semiconductor layer 15 are arranged in order in the direction of the second axis Ax2. An insulator layer 18 is provided on the cladding layer 13 as a region 17. The insulator layer 18 may be an inorganic insulating film including silicon compound (for example, a silicon dioxide film or a silicon nitride film) or composed of a benzocyclobutene (BCB) resin. The insulator layer 18 has a lower refractive index than that of the first cladding region 14. A surface of the insulator layer 18 is exposed to the outside (i.e. an air). In the present embodiment, a second surface 15B of the semiconductor layer 15 is in contact with the insulator layer 18.

On the outside of the semiconductor layer 15, the electric field amplitude of light is decreased rapidly and monotonically by the insulator layer 18 located outside the cladding layer 13 and having a low refractive index. The magnitude of the electric field of light in the semiconductor layer 15 is suppressed by the low refractive index of the insulator layer 18. In the first optical waveguide 10, the insulator layer 18 can adjust the amount of suppression in the magnitude of the electric field of light in the semiconductor layer 15 by changing the refractive index of the insulator layer 18.

STRUCTURAL EXAMPLE 3

Referring to FIG. 1E, in the first optical waveguide 10, a cladding layer 13 includes a first cladding region 14, a semiconductor layer 15, and a second cladding region 16. The first cladding region 14, the semiconductor layer 15, and the second cladding region 16 are arranged in order in the direction of the second axis Ax2. The refractive index of the second cladding region 16 is equal to or lower than the refractive index of the first cladding region 14. The refractive index of a region 17 is lower than the refractive index of the second cladding region 16. The thickness of the second cladding region 16 is smaller than that of the first cladding region 14. The second cladding region 16 has a third surface 16A and a fourth surface 16B. The third surface 16A is located on the side opposite to the fourth surface 16B. In the preset embodiment, the second surface 15B of the semiconductor layer 15 is in contact with the third surface 16A of the second cladding region 16. The fourth surface 16B of the second cladding region 16 is in contact with the air (region 17). On the outside of the semiconductor layer 15, the refractive index decreases in the order of the second cladding region 16 and the region 17.

The magnitude of the electric field of light decreases rapidly and monotonically in the second cladding region 16 and the region 17. The undesirable peak of the electric field at the semiconductor layer 15 is avoided by the existence of the second cladding region 16 and the region 17. In the first optical waveguide 10, in accordance with the refractive index and the thickness of the second cladding region 16, the second cladding region 16 can adjust the magnitude of the electric field of light in the semiconductor layer 15.

STRUCTURAL EXAMPLE 4

Referring to FIG. 1F in the first optical waveguide 10, a cladding layer 13 includes a first cladding region 14, a semiconductor layer 15, and a second cladding region 16. The first cladding region 14, the semiconductor layer 15, and the second cladding region 16 are arranged in order in the direction of the second axis Ax2. An insulator layer 18 is disposed on the second cladding region 16 as a region 17. The cladding layer 13 is provided between the core layer 12 and the insulator layer 18. The insulator layer 18 is in contact with the cladding layer 13. A third surface 16A of the second cladding region 16 is in contact with a second surface 15B of the semiconductor layer 15. A fourth surface 16B of the second cladding region 16 is in contact with the insulator layer 18. The refractive index of the second cladding region 16 is equal to or lower than the refractive index of the first cladding region 14. The refractive index of the insulator layer 18 is lower than the refractive index of the second cladding region 16. The refractive index of the region 17 is lower than the refractive index of the second cladding region 16. The thickness of the semiconductor layer 15 is smaller than that of the first cladding region 14. The thickness of the second cladding region 16 is smaller than that of the first cladding region 14

EXAMPLE 1

FIG. 2 is a graph showing an electric field profile of light (solid line) in an example of a first optical waveguide 10 at the end facet 10A. FIG. 2 shows refractive indices of respective layers (dotted line) of a first optical waveguide 10 at the end facet 10A. For the sake of ease of understanding, the reference numerals for each layers and regions shown in FIGS. 1A to 1F are shown in FIG. 2. A first model for of the optical waveguide 10 has a structure corresponding to the structural example 4 shown in FIG. 1F. The materials, thicknesses and refractive indices of each layers and regions included in the first model are listed in Table I.

TABLE I

A Structure of the first model of the optical waveguide 10.

| Layer name | Layer material | Thickness at end facet 10A | Refractive index |
|---|---|---|---|
| Insulator layer 18 | SiO$_2$ | 3 μm | 1.44 |
| Second cladding region 16 | InP | 0.5 μm or less | 3.17 |
| Semiconductor layer 15 | AlGaInAs bulk | 0.23 μm | 3.35 |
| First cladding region 14 | InP | 0.87 μm | 3.17 |
| Core layer 12 | AlGaInAs multi-quantum well | 0.12 μm | 3.4 |
| Lower cladding layer 11 | InP | 2 μm | 3.17 |
| Substrate 2 | InP | 200 μm | 3.17 |

For the semiconductor optical device 1 according to this example, light having a wavelength of a 1.55 μm-band (1.53 to 1.57 μm) may be used. For the semiconductor optical device 1, light in a wavelength range longer than 1.55 μm, for example, light having a wavelength of a 1.6 μm-band (1.565 to 1.625 μm) may also be used. Furthermore, for the semiconductor optical device 1, light in a wavelength range shorter than 1.55 μm, for example, light having a wavelength of a 1.5 μm-band (1.46 to 1.53 μm) may also be used.

An electric field distribution in the first optical waveguide 10 will be described with reference to the electric field profile shown in FIG. 2. In this description, for the sake of ease of understanding, the reference numerals used in FIGS. 1A to 1F are referred to. In the first optical waveguide 10, the electric field amplitude of light is the largest in the core layer 12. The electric field amplitude of light monotonically decreases in the cladding layer 13 from the core layer 12 toward the region 18. The combination of the refractive index of the first cladding region 14 and the semiconductor layer 15 enables the electric field amplitude of light to decrease slowly in the first cladding region 14. Though the thickness of the cladding layer 13 is much smaller than the thickness of the lower cladding layer 11, the electric field profile is almost symmetrical in the cladding layer 13 and the cladding layer 11. This is the effect of the existence of the semiconductor layer 15 having the high refractive index.

The semiconductor layer 15 is in contact with the second cladding region 16 having a lower refractive index than the semiconductor layer 15. In addition, the second cladding region 16 is in contact with the insulator layer 18. Therefore, the refractive index profile of the second cladding region 16 and the insulator layer 18 (a region 17) prevents the electric field amplitude of light in the semiconductor layer 15 from forming a large second peak.

On the outside of the semiconductor layer 15, the refractive index profile decreases in the order of the second cladding region 16 and the insulator layer 18. Therefore, the electric field amplitude of light decreases rapidly and monotonically on the outside of the cladding layer 13. In the semiconductor optical device 1, the refractive index profile of the second cladding region 16 and the insulator layer 18 can suppress the magnitude of the electric field amplitude of light in the semiconductor layer 15 that is in contact with the second cladding region 16. By changing the refractive indices of the second cladding region 16 and the insulator layer 18, the amount of decrease in the electric field profile of light in the second cladding region 16 and the insulator layer 18 is adjusted.

Figure 3:
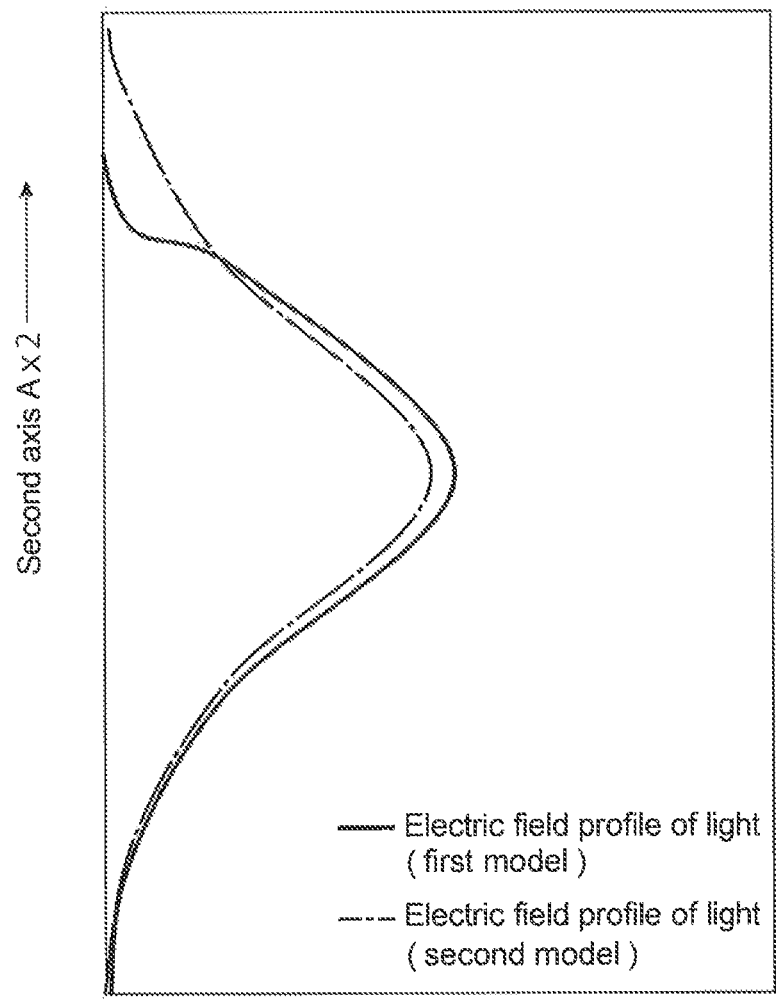
FIG. 3 is a graph showing an electric field profile of light in a first model and an electric field profile of light in a second model.

FIG. 3 is a graph showing an electric field profile of light in the first model and an electric field profile of light in a second model. The second model is shown as a comparative example. The second model differs from the first model in the structure of a cladding layer. In a semiconductor optical waveguide of the second model, the cladding layer is formed of a single material having a sufficiently large thickness. The sufficiently large thickness means that the thickness gives the ideal optical coupling to an external optical waveguide. The optical waveguide of the second model can provide an electric field profile that is good for a connection to an external optical waveguide. As shown in FIG. 3, the electric field profile of light of the optical waveguide of the first model substantially coincides with that of the second model in the vicinity of the core layer. This resemblance in the electric field profiles means that coupling loss between the optical waveguide of the first model and an external optical waveguide comes close to coupling loss between the optical waveguide of the second model and an external optical waveguide.

A simulation was performed using the beam propagation method (BPM) in order to estimate coupling losses between an external optical waveguide and the first optical waveguide of the first and second models. In this simulation, the following values listed in Table II were used as a thickness of a cladding layer. In the first model, the cladding layer 13 includes the first cladding region 14, the semiconductor layer 15 and the second cladding region 16 shown in Table I. In the second model, the cladding layer has the same refractive index as that of the first cladding region 14 of the first model. The cladding layer in the second model is uniform, and includes no semiconductor layer having a higher refractive index such as the semiconductor layer 15.

TABLE II

Structures of the first and second models and the coupling loss.

| Type of optical waveguide | Cladding layer thickness | Coupling loss |
|---|---|---|
| First model | 1.20 μm | 0.206 dB |
| Second model (comparative) | 1.94 μm | 0.213 dB |
| Second model (comparative) | 1.20 μm | 0.291 dB |

If the thickness of the uniform cladding layer of the second model is reduced to 1.20 μm, the coupling loss of the optical waveguide of the second model increases to 0.291 dB. On the other hand, the first model that has the semiconductor layer 15 in the cladding layer gives good coupling loss though the thickness of the cladding layer is as small as 1.20 μm.

The optical waveguide of the first model realizes spot-size conversion showing a good coupling loss with the cladding layer having a relatively small thickness. Since the cladding layer of the optical waveguide (for example, the first optical waveguide 10) of the first model has a small thickness, the cladding layer for the spot-size converter is compatible with a cladding layer 23 of an optical waveguide (for example, the second optical waveguide 20) for an active semiconductor device that is monolithically integrated with a spot-size converter.

In addition to the examination using the first model, similar examinations were also conducted for models described in the structural examples in FIGS. 1C to 1E. According to the results, characteristics similar to that of the first model are obtained in the structural examples described in the first embodiment.

In the waveguide of the first model, a first refractive index difference Δ1, which is a difference between the refractive index of the semiconductor layer 15 and the refractive index of the insulator layer 18, and a second refractive index difference Δ2, which is a difference between the refractive index of the semiconductor layer 15 and the refractive index of the second cladding region 16, are as follows.

First refractive index difference Δ1=3.35−1.5=1.85
Second refractive index difference Δ2=3.35−3.17=0.18

The first refractive index difference Δ1 is about 10 times larger than the second refractive index difference Δ2. The thickness of the second cladding region 16 can be thinner than 0.5 μm. The thickness of the second cladding region 16 is preferably smaller than the "wavelength of light in the medium". Herein, the term "wavelength of light in the medium" refers to a value calculated by dividing the wavelength of light in vacuum by the refractive index of the medium. In this case, the wavelength of light in the medium is calculated as 1.55/3.17≈0.5 µm. In such a case, a change in the electric field amplitude in the second cladding region 16 is small. In addition, since the refractive index difference Δ1 is 10 times larger than the second refractive index difference Δ2, the insulator layer 18 significantly affects the electric field distribution of the second cladding region 16 and of the semiconductor layer 15.

Figure 4:
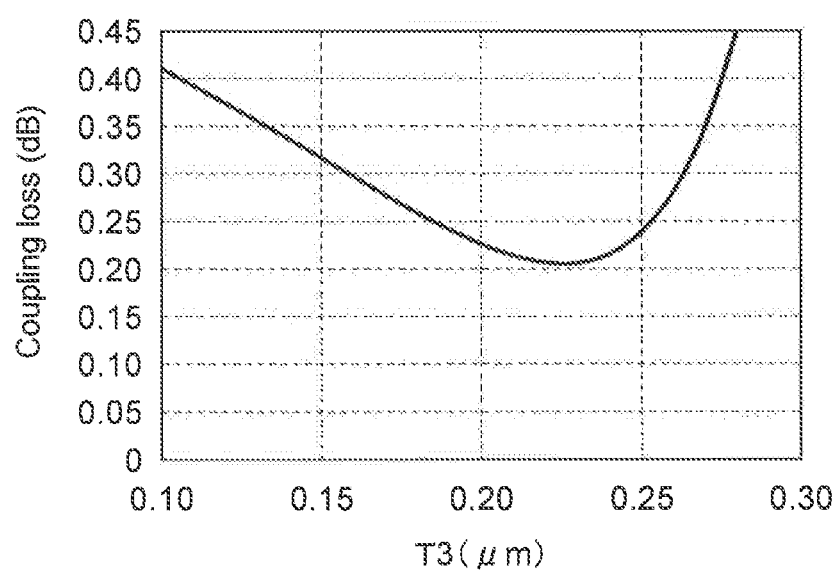
FIG. 4 is a graph showing a relationship between a thickness of a semiconductor layer of the cladding layer and coupling loss of a first optical waveguide with an external optical waveguide.

Specific examination results according to the optical waveguide will be further described. FIG. 4 shows a relationship between a thickness T3 of the semiconductor layer 15 and coupling loss between an external optical waveguide and the first optical waveguide 10 of the first model (the structural example 4 shown in FIG. 1F). In the first optical waveguide 10, when the thickness T3 of the semiconductor layer 15 is 0.23 µm, the coupling loss becomes a minimum of 0.206 dB. A thickness T4 of the second cladding region 16 also relates to the coupling loss. For example, in an optical coupling in an external optical waveguide including a lens having a mode field diameter of about 2 µm, the coupling loss becomes a minimum in a thickness T4 of the second cladding region 16 of 0.1 µm.

The first optical waveguide 10 is provided for spot-size conversion. Therefore, the electric field profile of light is broadened in the vicinity of the end facet 10A in order to perform spot-size conversion. The semiconductor layer 15 and the thickness T1 of the core layer 12 in the vicinity of the end facet 10A are useful for forming this broadening in the vertical direction. Specifically, the thickness T1 of the core layer 12 in the vicinity of the end facet 10A is preferably small. The thickness T1 may be, for example, in a range of 0.05 to 0.2 µm. In order to broaden the electric field profile of light in the vertical direction, the product of a refractive index n3 of the semiconductor layer 15 and the thickness T3 of the semiconductor layer 15 is preferably larger than the product of a refractive index n1 of the core layer 12 and the thickness T1 of the core layer 12. This is because when the product of the refractive index n3 and the thickness T3 is small, the electric field amplitude of light in the semiconductor layer 15 is excessively small due to the effect of the insulator layer 18 having a low refractive index, and the coupling loss increases.

The second optical waveguide 20 is optically coupled with a spot-size converter. The second optical waveguide 20 may be, for example, a structural component of a semiconductor modulator. The cladding layer 23 of the second optical waveguide 20 also has the same layer structure (including the first cladding region 14, the semiconductor layer 15, and the second cladding region 16) as the cladding layer 13 of the first optical waveguide 10. In order to improve the modulation efficiency, the semiconductor layer 15 is preferably located away from the core layer 22 by a certain degree in the direction of the second axis Ax2. Thus, in the second optical waveguide 20, a thickness T2 of the first cladding region 14 is preferably, for example, more than 0.4 µm.

In the second optical waveguide 20 and in the vicinity of the boundary 10B, the thickness D1 of the core layer 22 preferably has a dimension that satisfies a single-mode condition. The thickness D1 of the core layer 22 may be, for example, in a range of 0.2 to 0.6 µm. In the case where the second optical waveguide 20 is provided for, for example, a Mach-Zehnder modulator, this range of the core layer 22 is suitable as a value of a core layer of the Mach-Zehnder modulator.

In order to improve the modulation efficiency in the second optical waveguide 20, the product of the refractive index n3 and the thickness T3 of the semiconductor layer 15 is preferably smaller than the product of the refractive index n1 and the thickness D1 of the core layer 22 so that the electric field amplitude of light of the core layer 22 is larger than that of the semiconductor layer 15. Furthermore, in order to improve the modulation rate of a Mach-Zehnder modulator by decreasing a voltage drop (electrical resistance) in the cladding layer 23, the thickness of the cladding layer 23, which is usually doped to have a p-type or n-type conductivity, is preferably, for example, smaller than 1.8 µm from the viewpoint of a decrease in the resistance in proportional to the thickness.

In the case where the second optical waveguide 20 is, for example, a Mach-Zehnder modulator, the doping concentration of the core layer 22 is preferably lower than the doping concentration of the p-type or n-type cladding layer. The carrier concentration of the semiconductor layer 15 of the first optical waveguide 10 is preferably low from the viewpoint of decreasing optical loss caused by free carrier absorption due to doping.

In the case where the second optical waveguide 20 is a Mach-Zehnder modulator, a contact layer is provided in contact with an upper surface of the cladding layer 23. From the viewpoint of decreasing optical loss in the second optical waveguide 20 being caused by free carrier absorption, the carrier concentration of the contact layer is preferably lower than about $10^{19}$ cm$^{-3}$. The doping concentration of the core layer 12 of the first optical waveguide 10 and the doping concentration of the core layer 22 of the second optical waveguide 20 are each, for example, $5 \times 10^{17}$ cm$^{-3}$ or less. The carrier concentration of the semiconductor layer 15 is, for example, $2 \times 10^{18}$ cm$^{-3}$ or less.

In the case where the second optical waveguide 20 is a semiconductor modulator, the second width W2 may be, for example, 1.5 µm from the viewpoint of the modulation efficiency of the semiconductor modulator. When the magnitude of the broadening of the electric field profile of light in the transverse direction of an external optical waveguide is, for example, 2 µm, the first width W1 at a position of the end facet 10A may be, for example, 4 µm.

EXAMPLE 2

An illustrative structure according to the present embodiment will be described in Table III. The core layer 12 has a band-gap wavelength of 1.35 µm at the boundary 10B. The semiconductor layer 15 has a band-gap wavelength of 1.2 µm. Alternatively, a BCB resin may be used as the insulator layer 18. The refractive index of the BCB resin is almost the same as that of SiO$_2$.

TABLE III

Preferable structure of the first optical waveguide 10.

| Layer name | Layer material | Thickness at end facet 10A | Thickness at boundary 10B |
|---|---|---|---|
| Insulator layer 18 | SiO$_2$ | 3 µm | 3 µm |
| Second cladding region 16 | InP | 0 to 0.5 µm | 0 to 0.5 µm |
| Semiconductor layer 15 | AlGaInAs bulk | 0.05 to 0.4 µm | 0.05 to 0.4 µm |
| First cladding region 14 | InP | 0.4 to 1.5 µm | 0.2 to 0.6 µm |

TABLE III-continued

Preferable structure of the first optical waveguide 10.

| Layer name | Layer material | Thickness at end facet 10A | Thickness at boundary 10B |
| --- | --- | --- | --- |
| Core layer 12 | AlGaInAs multi-quantum well | 0.05 to 0.2 μm | 0.05 to 0.2 μm |
| Lower cladding layer 11 | InP | 2 μm | 2 μm |
| Substrate 2 | InP | 200 μm | 200 μm |

When the first cladding region 14 has the thickness in the range from 0.4 to 1.5 μm, the cladding layer 13 is suitable for the cladding layer 23 in the second optical waveguide 20 for a Mach-Zehnder modulator. As the cladding region 14 gives a preferably large electric field distribution of light in the core layer 22, and results in the high modulation performance.

Next, a method for producing the semiconductor optical device 1 will be described. FIGS. 5A to 5D are views each illustrating a step of a method for producing a semiconductor optical device according to the first embodiment. FIGS. 5A to 5D each illustrate an area corresponding to one semiconductor optical device 1. In the production of the semiconductor optical device 1, a substrate 2 composed of InP is prepared. A lower cladding layer 11 is epitaxially grown on the substrate 2 by metal organic chemical vapor deposition (MOCVD). The lower cladding layer 1 contains InP. A spacer layer 31 is epitaxially grown on the lower cladding layer 11. A shadow-mask layer 32 is formed on the spacer layer 31. The spacer layer 31 contains AlGaInAs. The shadow-mask layer 32 is composed of InP. The layers 31 and 32 are layers used for the shadow-mask. They will be removed later, and are not used for the optical waveguides. An insulating film for patterning the shadow-mask layer 32 is formed by chemical vapor deposition (CVD). The insulating film is composed of $Si_3N_4$. A resist mask is formed on the insulating film. An insulating film mask is formed by wet etching the insulating film using the resist mask. Buffered hydrofluoric acid (BHF) is used for the wet etching. Next, an opening portion 33 is formed in the shadow-mask layer 32 by dry-etching the shadow-mask layer 32 using the insulating film mask. The opening portion 33 has an edge 33a having a shape similar to a semi-elliptical shape, as illustrated in FIG. 5A.

After the opening portion 33 is formed on the shadow-mask layer 32, the insulating film mask is removed using BHF. The spacer layer 31 is etched by wet etching using a liquid mixture of sulfuric acid, hydrogen peroxide, and water. As a result of this etching, a gap 34 is formed below the shadow-mask layer 32 in the first region 2A. In the second region 2B, the shadow-mask layer 32 and the spacer layer are totally removed, and the surface of the lower cladding layer 11 is exposed.

The core layer 12 of a first optical waveguide 10 and the core layer 22 of the second optical waveguide 20 are grown on the first cladding layer 11 by MOCVD. The core layer 12 and the core layer 22 are formed simultaneously. The thickness of the core layer 12 becomes smaller than that of the core layer 22, because in the first region 2A, the shadow-mask layer 32 shields the supply of raw materials for the core layer. The thickness of the core layer 22 becomes larger than that of the core layer 12, because there is no mask above the lower cladding layer 11 in the second region 2B. The shielding of raw materials depends on the width (W10) of the opening portion 33. In this embodiment, the width W10 gets broader in the first region 2A from the end facet 10A toward the second region 2B. Thus, the core layer 12 becomes thicker in the first region 2A from the end facet 10A toward the second region 2B. The core layer 12 and the core layer 22 are formed of a multi-quantum well containing AlGaInAs. A cap layer 24 composed of InP, which is the same material as that of a first cladding region 14, is formed so as to cover the core layers 12 and 22.

After the cap layer 14 is formed, the spacer layer 31 and the shadow-mask layers are removed by wet etching. The etchant for the wet etching is a liquid mixture of sulfuric acid, hydrogen peroxide, and water. The core layers 12 and 22 are not etched as being covered by the cap layer 24 as illustrated in FIG. 5B. After the removal of the shadow-mask layer 32, stacked semiconductor layers for the cladding layer 13 and the cladding layer 23 are formed in the first and second regions 2A and 2B, as illustrated in FIG. 5C. A first cladding region 14, a semiconductor layer 15, and a second cladding region 16 are sequentially grown on the cap layer 24 in the first and second regions 2A and 2B. The cladding layer 13 and the cladding layer 23 are formed simultaneously using MOCVD method. The cladding layer 13 and the cladding layer 23 are composed of the same materials, and have the same thickness.

After the formation of the cladding layers, a mask is formed on the cladding layers 13 and 23. The mask has a stripe shape of the first optical waveguide 10 and the second optical waveguide 20. The semiconductor layers are dry-etched by using the mask to form optical waveguides. After the etching, the mask is removed. An insulating film for passivation is deposited. The insulating film in the first region 2A acts as a region 17 with a low refractive index. The semiconductor optical waveguides 10 and 20 are embedded by a BCB resin. An electrode 29 is formed in the second region 2B on the optical waveguide 20, as shown in FIG. 5D. The electrode 29 is used to apply the bias voltage to the optical waveguide 20 when the optical waveguide 20 is a semiconductor modulator.

In the semiconductor optical device 1, in the case where the second optical waveguide 20 is the semiconductor modulator, a light from an external optical waveguide is optically coupled with the first optical waveguide 10 at a low coupling loss. Subsequently, the light that has been subjected to spot-size conversion by the first optical waveguide 10 is introduced to the optical waveguide 20, and is modulated by the semiconductor modulator of the second optical waveguide 20.

Second Embodiment

Figure 6A:
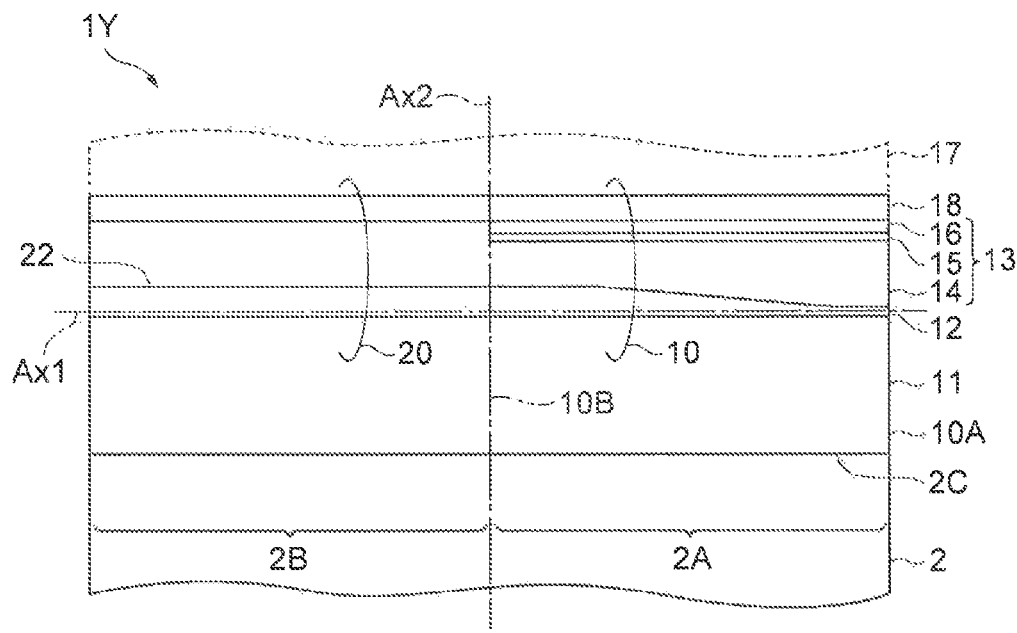
FIGS. 6A and 6B are views each illustrating a structure of a semiconductor optical device according to a second embodiment.
Figure 6B:
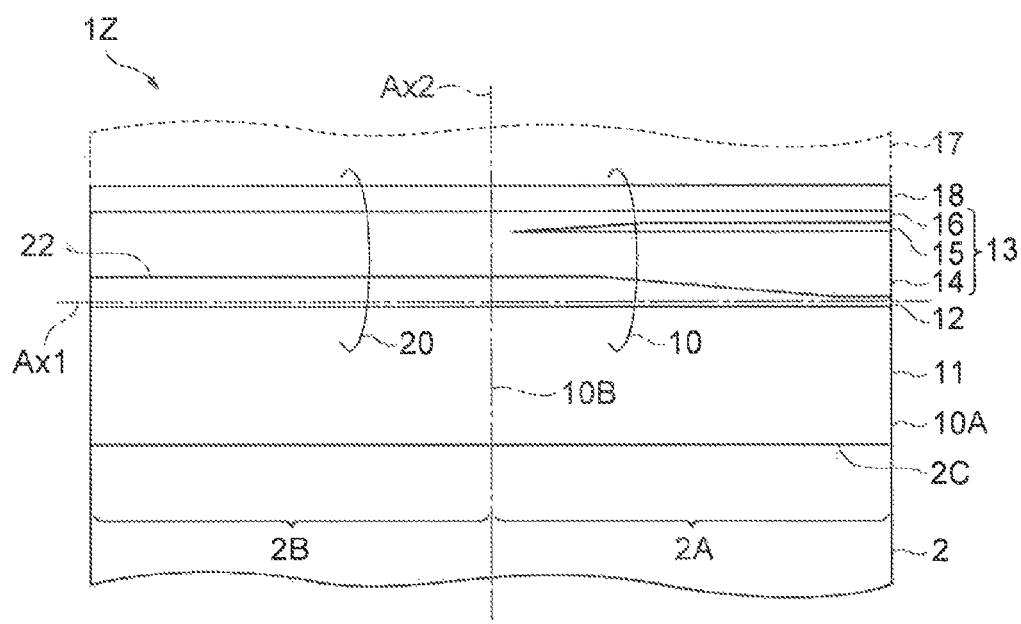

FIGS. 6A and 6B are views each illustrating a structure of a semiconductor optical device according to a second embodiment. Referring to FIG. 6A, in a semiconductor optical device 1Y, the thickness of a first cladding region 14 of a first optical waveguide 10 increases gradually from a boundary 10B to an end facet 10A. This structure compensates for a decrease in the thickness of a core layer 12 from the boundary 10B to the end facet 10A. Therefore, an upper surface of the first optical waveguide 10 extends along a reference surface that defines an upper surface of a second optical waveguide 20 with respect to a direction of a first axis Ax1. An upper surface of the semiconductor optical device 1Y formed by the first optical waveguide 10 and the second optical waveguide 20 has, for example, a shape that is considered a substantially flat or gentle curve. The thickness of the cladding layer 13 of the first optical waveguide 10 is substantially the same as that of the second waveguide 20 at the boundary 10B. With this structure, the semiconductor optical device 1Y can be easily mounted on another optical device. The cladding layer 13 and an insulator layer 18 that are formed on the core layer 12 are arranged in a direction of a second axis Ax2. This structure is formed as follows. A first insulating film mask having an opening on a core layer 12 and a core layer 22 is formed. The width of the opening of the first insulating film mask decreases gradually from the boundary 10B to the end facet 10A on the core layer 12. A first cladding region 14 is selectively grown by using the first insulating film mask. As a result, the first cladding region 14 whose thickness increases from the boundary 10B on the first optical waveguide 10 to the end facet 10A is obtained. This selective growth is performed by metal organic vapor phase epitaxy (MOVPE). The first insulating film mask is removed, and a semiconductor layer 15 is then epitaxially grown on the first cladding region 14. A second insulating film mask is formed on the semiconductor layer 15 on the first region 2A. The semiconductor layer 15 on the second region 2B is selectively etched with, for example, a liquid mixture of sulfuric acid, hydrogen peroxide, and water. The second insulating film mask is removed. Subsequently, a second cladding region 16 is epitaxially grown, and an insulator layer 18 is deposited on the second cladding region 16 by CVD.

Referring to FIG. 6B, in a semiconductor optical device 1Z, by gradually increasing the thickness of a semiconductor layer 15 of a first optical waveguide 10 from a boundary 10B to an end facet 10A, the effect of the semiconductor layer 15 in the end facet 10A and in the vicinity of the end facet 10A is increased. The thickness of the semiconductor layer 15 decreases from the end facet 10A to the boundary 10B, and lastly disappears and ends. According to this structure, since the semiconductor layer 15 is not provided in the vicinity of the boundary 10B and in a second optical waveguide 20, the electric field amplitude of light concentrates on the core layer 22. In the case where the second optical waveguide 20 that is optically coupled with the core layer 22 is provided for, for example, a semiconductor modulator, the modulation efficiency of the semiconductor modulator can be improved. The thickness of the cladding layer 13 of the first optical waveguide 10 is substantially the same as that of the second waveguide 20 at the boundary 10B. In the semiconductor optical device 1Z, the semiconductor layer 15 of a cladding layer 13 formed on a core layer 12 ends in the vicinity of the boundary 10B. This structure is formed as follows. A first cladding region 14 is selectively grown on a core layer 12 and a core layer 22. Subsequently, a semiconductor layer 15 is selectively grown by using a third insulating film mask having a pattern such that the thickness of the semiconductor layer 15 increases from the boundary 10B on the first optical waveguide 10 to the end facet 10A. Etching is performed with, for example, a liquid mixture of sulfuric acid, hydrogen peroxide, and water by such a thickness that the semiconductor layer 15 disappears on the second region 2B and the semiconductor layer 15 remains on the first region 2A. A second cladding region 16 is grown, and an insulator layer 18 is deposited thereon.

In the preferred embodiments, the principle of the present invention has been described with reference to the drawings. It is to be understood by a person skilled in the art that the arrangement and details of the present invention may be changed without departing from the principle. The present invention is not limited to specific structures disclosed in the embodiments. Accordingly, we claim the right to the scope of the claims and all modifications and changes within the scope of the spirit of the claims.

What is claimed is:

1. A semiconductor optical device comprising:
   a substrate including a first region and a second region arranged in a first direction;
   a first optical waveguide disposed on the first region, the first optical waveguide including a core layer and a cladding layer disposed on the core layer, the cladding layer including a first cladding region, a semiconductor layer disposed on the first cladding region, and a second cladding region on the semiconductor layer, the first optical waveguide extending in the first direction from an end facet of the semiconductor optical device to a boundary between the first region and the second region;
   a second optical waveguide disposed on the second region, the second optical waveguide being optically connected to the first optical waveguide at the boundary; and
   a region disposed on the cladding layer, the region having a lower refractive index than that of the first cladding region, wherein
   the semiconductor layer has a higher refractive index than that of the first cladding region,
   the core layer has a first thickness at a vicinity of the end facet of the semiconductor optical device and a second thickness at the boundary between the first region and the second region,
   the thickness of the core layer monotonically increases from the first thickness to the second thickness in the first region along the first direction,
   the second cladding region has thickness smaller than that of the first cladding region,
   the second cladding region has a refractive index lower than that of the semiconductor layer, and
   the second cladding region is in contact with the region disposed on the cladding layer.

2. The semiconductor optical device according to claim 1, wherein the second optical waveguide has a cladding layer having substantially the same thickness as the cladding layer of the first optical waveguide.

3. The semiconductor optical device according to claim 1, wherein
   the first optical waveguide has a first width at the end facet and a second width at the boundary, and
   the first optical waveguide has a width monotonically decreasing from the first width to the second width in the first region along the first direction.

4. The semiconductor optical device according to claim 1, wherein the region disposed on the cladding layer is composed of a silicon dioxide or a benzocyclobutene resin.

5. The semiconductor optical device according to claim 1, wherein the second cladding region is composed of InP.

6. The semiconductor optical device according to claim 1, wherein
   the first cladding region is composed of InP,
   the core layer is composed of AlGaInAs, and
   the semiconductor layer is composed of AlGaInAs.

7. The semiconductor optical device according to claim 1, wherein the first optical waveguide includes a spot-size converter, and the second optical waveguide includes an Mach-Zehnder modulator.

8. The semiconductor optical device according to claim 1, wherein the first cladding region is disposed on the core layer, and the region disposed on the cladding layer is disposed on the semiconductor layer thereof.

9. The semiconductor optical device according to claim 1, wherein the first cladding region has a thickness larger than that of the semiconductor layer.

10. The semiconductor optical device according to claim 1, wherein the core layer, the first cladding region, and the semiconductor layer are composed of III-V group compound semiconductors.

\* \* \* \* \*